United States Patent [19]

Schoenherr et al.

[11] Patent Number: 5,606,393
[45] Date of Patent: Feb. 25, 1997

[54] ILLUMINATION MEASURING DEVICE FOR PANORAMIC PHOTOGRAPHY

[75] Inventors: Hans-Joerg Schoenherr; Hans Zimmet, both of Dresden; Michael Lenk, Pirna; Karl-Heinz Werner, Dresden; Udo Postel, Dresden, all of Germany

[73] Assignee: Kamerawerke Noble GmbH, Dreaden, Germany

[21] Appl. No.: 548,666

[22] Filed: Oct. 26, 1995

[51] Int. Cl.⁶ .............. G03B 7/08; G03B 37/00; G01J 1/02; G01J 1/42

[52] U.S. Cl. .............. 396/20; 356/222; 356/225; 396/233; 396/169; 396/170

[58] Field of Search ................ 354/429, 432, 354/94, 95, 96, 98, 99, 465, 471, 475, 456, 446, 453; 356/221, 222, 225; 250/214 P

[56] References Cited

U.S. PATENT DOCUMENTS

| | | | |
|---|---|---|---|
| 3,286,097 | 11/1966 | Norwood | 356/222 |
| 3,582,210 | 6/1971 | Jones | 356/222 X |
| 4,110,049 | 8/1978 | Younskevicius | 356/222 |
| 4,309,091 | 1/1985 | Fukuhara et al. | 354/432 |

*Primary Examiner*—W. B. Perkey
*Attorney, Agent, or Firm*—Michael J. Striker

[57] ABSTRACT

An illumination measuring device for panoramic picture taking has a first photoelectric illumination intensity receiver which diffusely determines light falling in a first measuring region and illuminating a first panoramic portion, at least one further photoelectric illumination intensity receiver which diffusely determines light falling in a second measuring region and illuminating a further panoramic portion, and an evaluating unit determining a deviation of an illumination intensity determined by the further illumination intensity receiver from an illumination intensity determined by the first illumination intensity receiver.

15 Claims, 2 Drawing Sheets

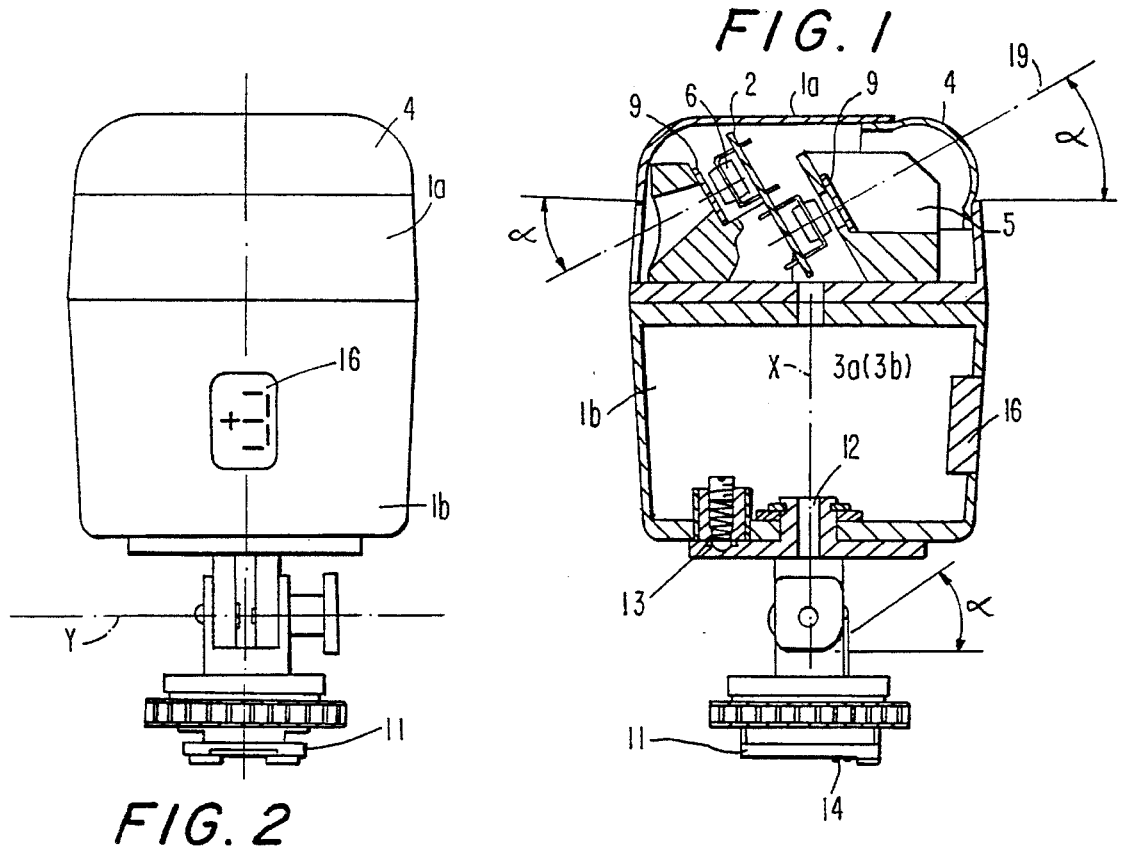
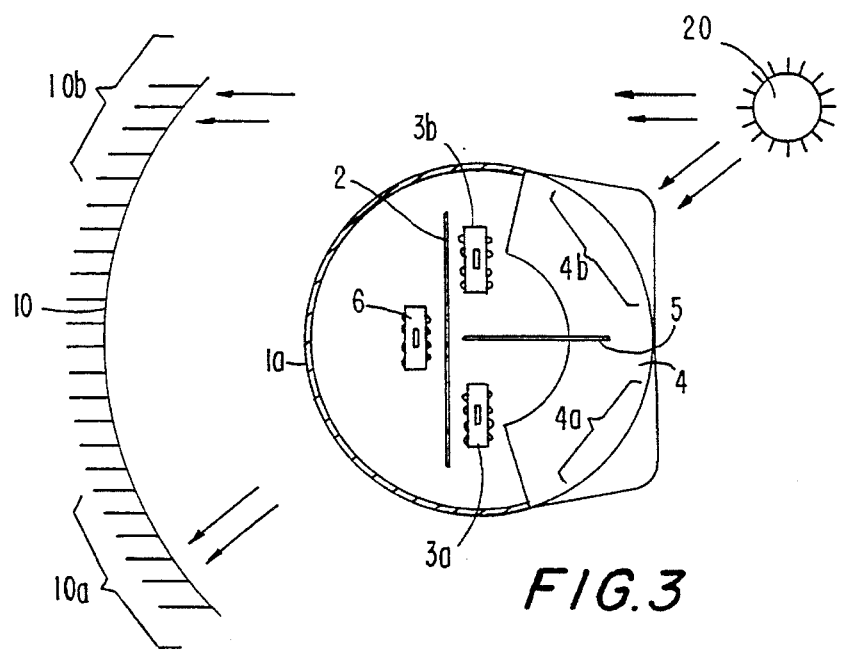

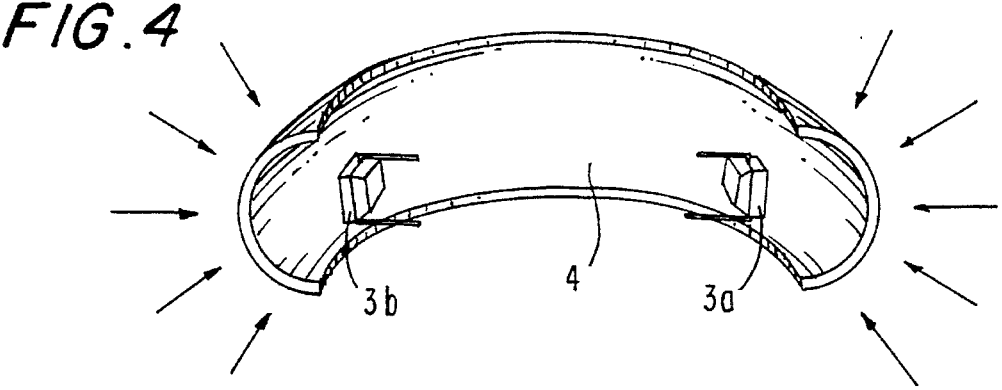
FIG. 4
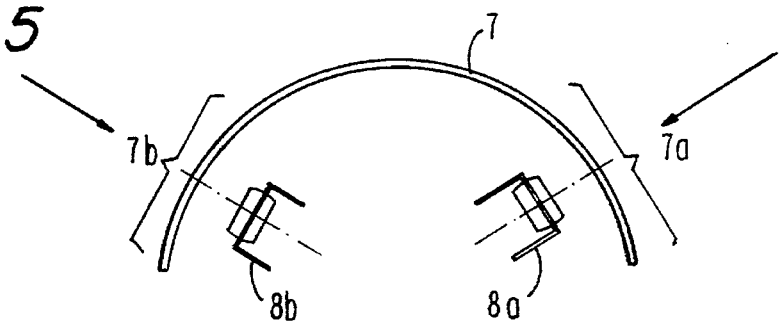
FIG. 5
FIG. 6
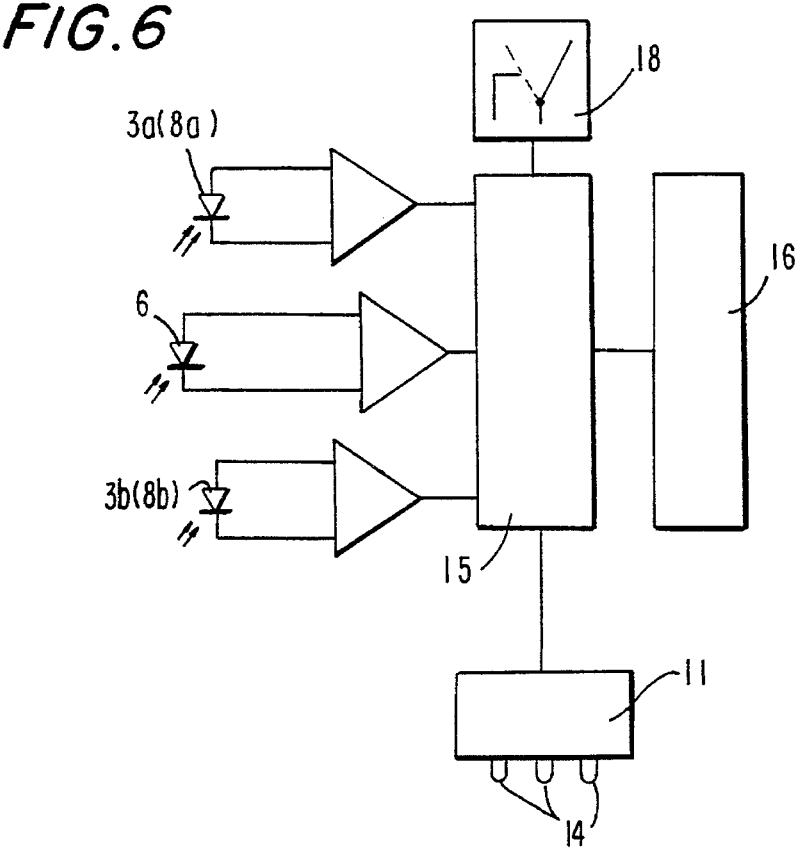

ILLUMINATION MEASURING DEVICE FOR PANORAMIC PHOTOGRAPHY

BACKGROUND OF THE INVENTION

The present invention relates to an illumination measuring device for panoramic photographic picture taking.

In panoramic photography there are always conditions when a non-uniform illumination of the scene occurs. During for example a horizontal panorama with its one lateral brightened by approximately perpendicularly falling sunlight, at the other lateral end the sunlight falls in some cases tangentially. For producing a uniformly illuminated panoramic image, different illuminations during the panoramic picture taking were needed. The thusly required illumination changes can be produced both by the varying of the rotary speed of the slotted drum which carries the objective, as well as a changing the shutter opening of the objective.

Because of the non-uniform distribution of the brightness inside the panoramic scene, frequently contrast-rich panoramic objects are produced. Therefore, it is recommended to provide the illumination in an intensity measurement directed against the light source or in other words the light measurement. In addition to the required differentiated illumination of the panoramic scene in every case the determination of the different illumination of the panorama to be photographed remains. In the known illumination measuring devices the illumination differences of interest are however determined by several measurements.

SUMMARY OF THE INVENTION

Accordingly, it is an object of the present invention to provide an illumination measuring device for differentiated illumination intensity measurement for panoramic picture taking.

In keeping with these objects and with others which will become apparent hereinafter, one feature of the present invention resides, briefly stated, in an illumination measuring device having a first photoelectric illumination intensity receiver which diffusely determines substantially the light falling in a first measuring region and illuminating a first panorama portion, at least one further photoelectric illumination intensity receiver which diffusely determines substantially the light falling in a second measuring region as well as a further panorama portion, and an evaluating unit for determining the deviation of the illumination intensity determined by the above mentioned further illumination intensity receiver from the illumination intensity determined by the above mentioned first illumination intensity receiver.

In accordance with further features of the present invention, the illumination measuring device can be provided with an indicating unit for indicating the deviation determined by the evaluating unit. The illumination intensity receivers can be arranged behind a torus-shaped curved diffuser. A light screen can be provided between the illumination intensity receivers. The evaluation unit can be connected with a control circuit for changing the turning speed of the objective during the panoramic picture taking. The control unit can change the opening of the shutter of the objective during the-panoramic picture taking.

The device can be provided with a light density receiver which has the photoelectric illumination intensity receivers and additionally influences the changing speed of the objective and/or the changes of the opening of the objective shutter during the panoramic picture taking.

An accessory shoe can be arranged on the housing of the illumination measuring device for coupling to a panoramic camera. The accessory shoe can accommodate transmission contacts which are electrically connected with the evaluating unit. It also can be rotatable about an axis which in coupled condition extends between the illumination measuring device and the panoramic camera parallel to the turning axis of the objective.

In the coupling condition between the illumination measuring device and the panoramic camera, the diffuser can be lifted relative to the illumination intensity receivers from a plane extending parallel to the turning plane of the objective about an angle of inclination. The accessory shoe can be arranged on the housing of the illumination measuring device tiltably parallel to the plane of the inclination angle.

A change-over switch can be associated with the evaluating unit for changing the determined deviation in the sense of plus-minus reverse.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of an illumination measuring device in accordance with the present invention, in a section;

FIG. 2 is a rear view of the inventive illumination measuring device;

FIG. 3 is a view from above of the inventive illumination measuring device in a section;

FIG. 4 is a view showing a torus-like diffuser of the inventive illumination measuring device;

FIG. 5 is a view showing a further arrangement of several photoelectric receivers of the inventive illumination measuring device; and FIG. 6 is a view showing a wiring diagram of the inventive illumination measuring device.

DESCRIPTION OF THE PREFERRED EMBODIMENTS

An illumination measuring device in accordance with the present invention has a housing which is identified with reference numeral 1 and composed of a head part 1a and a foot part 1b. A foot part 1b is provided with a accessory shoe 11 for connection with a panoramic camera. The accessory shoe 11 together with the foot part 1b is turnable an axis x due to a pin 12. A ball catch 13 serves for fixing arbitrary rotary positions. In addition, the accessory shoe 11 can move perpendicular to the rotary axis x around a turning axis y in a circumference of an angle of inclination α, for uniformly lifting the central measuring plane 19. Springy transmission contacts 14 are further provided in the accessory shoe 11.

Illumination intensity receivers 3a and 3b are arranged in the head part 1a on a printed circuit board 2 at a distance from one another as can be seen in FIGS. 1 and 3. The arrangement is selected so that the illumination intensity receivers 3a and 3b are located with a diffuser 4 in the same measuring plane 19 which is tiltable from a plane extending perpendicular to-rotary axis x about an angle of inclination a. The torus-shaped diffuser 4 is curved over the illumination intensity receivers 3a and 3b as shown in FIG. 4. A light screen 5 is located between the illumination intensity receivers 3a and 3b. In addition, a filter 9 is arranged over the illumination intensity receivers 3a and 3b for spectral adaptation.

A photoelectric light density receiver 6 is mounted on the printed circuit board 2. Its measuring direction is opposite to the central measuring direction of the illumination intensity receivers 3a and 3b. For example, the illumination intensity receivers 3a and 3b are oriented in the direction of the light measurement toward the sun 20, while the light density receiver 6 is arranged in direction of the object measurements for picture taking object. The light density receiver 6 is simultaneously protected from undesired illumination over the diffuser 4 by the printed circuit board 2.

The foot part 1b has a chamber for an evaluating unit 15 as schematically shown in FIG. 6. An indicating unit 16 is connected with the evaluating unit 15. Furthermore, the evaluating unit 15 is electrically connected with transmission contacts 14 of the accessory shoe 11. A change-over switch 18 is electrically connected with the evaluating unit 15.

The illumination measuring device can be used as a manual illumination measuring device or in connection with a panoramic camera. The coupling with a panoramic camera is performed through the accessory shoe 11 which is displaceable in a corresponding shoe of the panoramic camera, so that the rotary axis x extends parallel to the turning axis of the camera objective. The housing 1 can turn on the accessory shoe 11 about the axis x.

For measuring the illumination intensity firstly the illumination intensity receivers 3a and 3b are oriented away from the panoramic object to be photographed (light measurement). Conventionally the diffuser 4 is located symmetrically opposite to the panoramic object 10 to be photographed as can be seen from FIG. 3. In the case of the coupling with a panoramic camera, the orientation of the illumination intensity receivers 3a and 3b is performed after overcoming the ball catch 13 by turning of the housing 1 about the axis x.

When the illumination device is oriented in this way, the illumination intensity receivers 3a and 3b are illuminated differently by falling light through the diffuser 4. With the light screen 5 in the shown position the sun 2d shown in FIG. 3 illuminates the illumination intensity receiver 3b more intense than the illumination intensity receiver 3a. The illumination difference is determined by the evaluating unit 15 and can be read in the indicating unit 16. With plus or in some cases minus symbols, the illumination direction can be determined, for example the location of the sun. Additionally, the degree of the illumination difference, in other words the deviation from the illumination intensity determined by the illumination intensity receiver 3a relative to the illumination intensity determined by the illumination intensity receiver 3b can be represented by the numerical value.

The deviation determined by the evaluating unit 15 can be supplied by the transmission contact 14 of the accessory foot 11 also to the control device of the camera. This control device provides changes of the opening of the objective shutter or the speed of the slotted drum which carries the objective during the panoramic picture taking. The electrical connection for a signal transmission between the illumination measuring device 1 and the panoramic camera can be performed through a cable or in a wireless manner.

The change-over switch is provided for selectively dealing with panoramic objects extending parallel to a natural horizon (wide format) or panoramic objects extending perpendicularly (high format). With each operation it can be taken into consideration that for the wide format the illumination intensity receiver 3b which for example is illuminated more intense by the sun 2d must signal the weaker illumination of the diagonally opposite panorama portion 2a, while for high format the same illumination intensity receiver 3b determines the more intense light part which however must occur for the weaker illumination of the upper panorama portion 10b. For the wide format the change-over switch 18 is for example open and therefore the evaluating unit 15 supplies the plus value for the indicating unit 16, as well as control values supplied to the transmission contact 14. For the high format the change-over switch 18 is closed, so that the evaluating unit 15 provides a minus value. The actuation of the change-over switch 18 can be performed manually and also by a position detector which recognizes the different holdings of the panoramic camera or the illumination measuring device for the wide format picture taking or high format picture taking.

The light density receiver 6 connected with the evaluating unit 15 operates for object measurement, in other words for determination of the light reflected from the illuminated panoramic object 10. The numerical value of the deviation determined by the illumination intensity receivers 3a and 3b can be additionally influenced by the measuring output of the light density receiver 6. In this way the steepness of the illumination changes provided by the determined deviation during the panoramic picture taking is influenceable. In particular, the speed of the slotted drum and/or the opening of the objective shutter is changed more or less fast.

Special variants of the picture taking can be taken into consideration by tilting of the housing 1 in correspondence with the inclination angle $\alpha$. For example, for the wide format the overriding determination of the sky parts by the illumination intensity receivers 3a and 3b is advantageous, while the measuring direction is lifted about the inclination angle $\alpha$ relative to the horizontals. In contrast, for the high format the orientation of the illumination intensity receivers 3a and 3b as well as the diffuser 4 is advantageous in a plane which is perpendicular to the vertical high format.

In accordance with a further embodiment shown in FIG. 5, the diffuser 7 is curved in a band-shaped manner over the illumination intensity receivers 8a and 8b. The illumination intensity receivers 8a and 8b are oriented radially differently relative to the diffuser 7 so that the light screen 5 can be dispensed with.

Also, other modifications are possible. For example, the illumination intensity receivers can be covered by separate diffusers or can have a joint diffuser with a prismatically shaped cross-section. It is important that at least two illumination intensity receivers are provided for comparison of the illumination intensities occurring in neighboring measuring regions. These several illumination intensity receivers can be also components of a receiver cell or matrix.

It will be understood that each of the elements described above, or two or more together, may also find a useful application in other types of constructions differing from the types described above.

While the invention has been illustrated and described as embodied in an illumination measuring device for panoramic photography, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An illumination measuring device for panoramic picture taking, comprising a first photoelectric illumination intensity receiver which diffusely determines light falling in a first measuring region and illuminating a first panoramic portion; at least one further photoelectric illumination intensity receiver which diffusely determines light falling in a second measuring region and illuminating a further panoramic portion; and an evaluating unit determining a deviation of an illumination intensity determined by said further illumination intensity receiver from an illumination intensity determined by said first illumination intensity receiver.

2. An illumination measuring device as defined in claim 1; and further comprising an indicating unit for representing said deviation determined by said evaluating unit.

3. An illumination measuring device as defined in claim 1; and further comprising a torus-shaped curved diffuser, said illumination intensity receiver being arranged behind said diffuser.

4. An illumination measuring device as defined in claim 1; and further comprising a light screen located between said illumination intensity receivers.

5. An illumination measuring device as defined in claim 1; and further comprising a control circuit connected with said evaluating unit and operative for changing a turning speed of an objective of a panoramic camera during the panoramic picture taking.

6. An illumination measuring device as defined in claim 1; and further comprising a control circuit connected with said evaluating unit and operative for changing an opening of a shutter of an objective of a panoramic camera during panoramic picture taking.

7. An illumination measuring device as defined in claim 1; and further comprising a photoelectric light density receiver adapted to face a panorama object opposite to said photoelectric illumination intensity receivers, said light density receiver being also influenced by changing a turning speed of an objective of a panoramic camera during panoramic picture taking.

8. An illumination measuring device as defined in claim 1; and further comprising a photoelectric light density receiver adapted to face a panorama object opposite to said photoelectric illumination intensity receivers, said light density receiver influenced by changing an opening of an objective of a panoramic camera and changing of an opening of an objective shutter of the panoramic camera during panoramic picture taking.

9. An illumination measuring device as defined in claim 1; and further comprising a housing; and an accessory shoe arranged on said housing for coupling with a panoramic camera.

10. An illumination measuring device as defined in claim 9, wherein said accessory shoe has transmission contacts electrically connected with said evaluating unit.

11. An illumination measuring device as defined in claim 9, wherein said accessory shoe is turnable about an axis which is adapted to extend parallel to a turning axis of an objective of a panoramic camera when the illumination measuring device and the panoramic camera are coupled with one another.

12. An illumination measuring device as defined in claim 3, wherein said diffuser is arranged so that when the illumination measuring device is coupled with a panoramic camera said diffuser is lifted relative to said illumination intensity receivers from a plane extending parallel to a turning plane of an objective of the panoramic camera about an inclination angle.

13. An illumination measuring device as defined in claim 12, wherein said housing has an accessory shoe for coupling to the panoramic camera, said accessory shoe being arranged tiltably parallel to a plane of said inclination angle.

14. An illumination measuring device as defined in claim 1; and further comprising a change-over switch associated with said evaluating unit for changing the determined deviation to provide a plus-minus reverse.

15. An illumination measuring device as defined in claim 14; and further comprising a position detector which recognizes horizontal or vertical holding of the panoramic camera or the illumination measuring device corresponding to wide format and high format panoramic picture taking so as to correspondingly actuate said change-over switch.

* * * * *